HUNT & HAINES.
Seed-Planter.

No. 19,026.

Patented Jan. 5, 1858.

UNITED STATES PATENT OFFICE.

M. J. HUNT AND J. H. HAINES, OF RISING SUN, MARYLAND.

IMPROVEMENT IN SEED-PLANTERS.

Specification forming part of Letters Patent No. 19,026, dated January 5, 1858.

*To all whom it may concern:*

Be it known that we, MARSHALL J. HUNT and JOSEPH H. HAINES, of Rising Sun, in the county of Cecil and State of Maryland, have invented certain new and useful Improvements in Corn-Planters; and we do hereby declare that the following is a full, clear, and exact description of the construction and operation of the same, reference being had to the accompanying drawings, in which—

Figure 1:
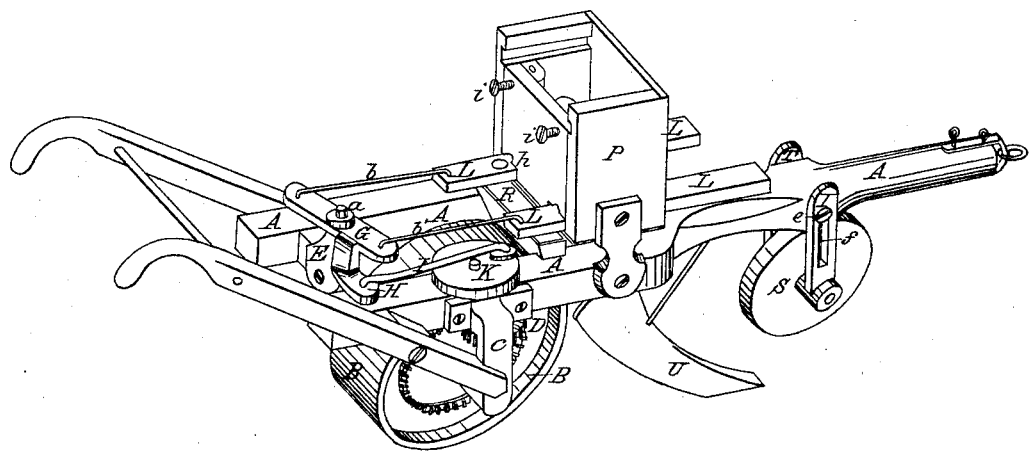
Figure 2:
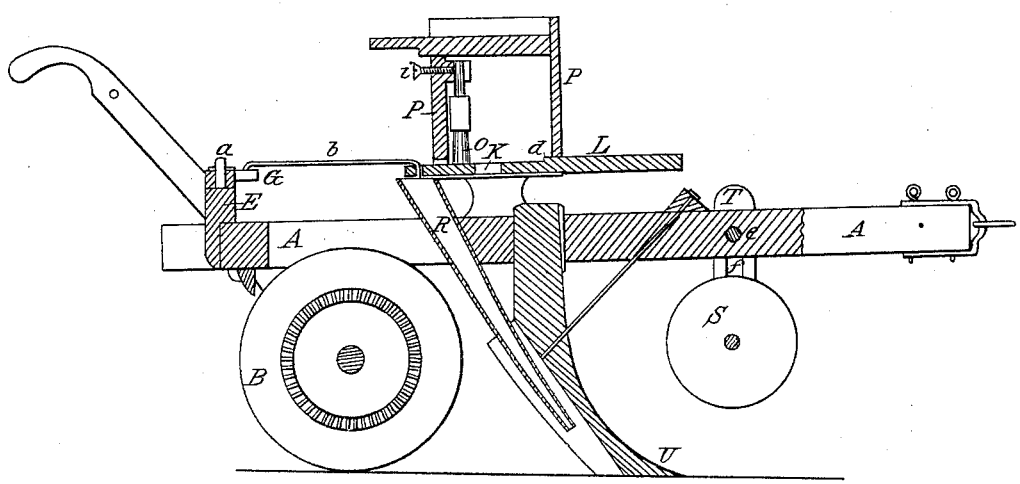

Figure 1 represents a perspective view of said corn-planter. Fig. 2 represents a longitudinal vertical section through the same.

The nature of this invention relates to the peculiar construction and operation of the seed-slides, so as to keep the grain in motion and more certainly insure regular planting, and the peculiar construction of the cross-head that operates said slides, so that a single one or a pair may be used without cramping the parts or causing them to work hard.

To enable others skilled in the art to make and use our invention, we will proceed to describe the same with reference to the drawings.

A represents the frame of the machine.

B represents the driving-wheel, which has its bearings in the brackets C, which are secured to the sides of the frame A. The driving-wheel is formed on one side with suitable cogs, which mesh into the cogs of pinion D, which transmits motion to the seed-slides.

E represents a bracket, which is secured to the frame A, and which supports a cross-head, G, which can freely turn on pivot $a$. The cross-head is formed with three arms, the two upper arms operating upon the seed-slides, and the lower arm, H, which is shaped and connected to the cross-head in a peculiar manner, serving to receive the end of rod I, which is set in motion by disk K, said disk being secured on the shaft of the pinion D. The upper arms of the cross-head G are connected with the seed-slides L by means of the rods $b$ $b'$, and the seed-slides are vibrated in a longitudinal direction as the machine moves over the field.

The rods $b$ $b'$ and I are not permanently secured to their respective levers and slides, but are only hooked with their bent ends into suitable holes in said levers and slides, and can be readily withdrawn for the purpose of stopping the seeding apparatus. The seed-slides L rest on the bottom of the hopper P, and move within said hopper the brush O, preventing the grain on the slide from being carried out to the rear of the hopper.

It has been found to be a very difficult matter in corn-planters to drop one grain of corn at a time, for, as in this case, the seed-cell $h$ has to be sufficiently small not to hold more than one grain, which, when the grain is packed in the hopper P, will often not enter the cell at all. To prevent this we have formed our seed-slides with an offset or shoulder, $d$, and as said slide is moved to the rear of the machine it sets the grain which rests on the slide in motion, forcing the grain into cell $h$, while if the slide L were of the same thickness throughout, the grain resting on the same would be comparatively at rest during the passage of the slide.

The operation of this machine will be fully understood by the preceding description. The driving-wheel B imparts rotary motion to pinion D and disk K, the latter imparting a reciprocating motion to rod I and a vibrating motion to lever G, which operates the seed-slides, the grain being carried in the cells $h$ to the rear of the seed-box and drop into the seed-tube R, and the attendant in the rear can observe the discharge of each cell, and thus insure the dropping of the seed. If it is desired to work only one of the slides L, the rod $b'$ is withdrawn, and the rod I now operates so as to counterbalance the motion of rod $b$ and its slide, thereby effecting a regular discharge of the seed without cramping its easy operation.

The bent form of the arm H and its connection to the cross-head, as shown, prevent there being any dead-point in the three rods $b$ $b'$ I—that is to say, prevents any two of them from being at extremes of their motions at the same time—and thus there is no binding or cramping of the parts.

S is a supporting-wheel hung to the beam A by two arms, T T, with slots $f$ through them, through which slots and through the beam passes an adjusting-screw for regulating the position of said wheel S, which in turn regulates the depth at which the shoe U shall enter the ground.

$i$ $i$ are set-screws for setting and holding the brushes O.

Having thus fully described the nature of our invention, what we claim therein as new, and desire to secure by Letters Patent, is—

1. A vibrating slide formed with an off-set, *d*, substantially in the manner and for the purpose herein described.

2. Giving to said slide a vibrating motion by means of cross-head G, having a third arm, H, extending from it, substantially in the manner and for the purpose set forth.

MARSHALL J. HUNT.
JOSEPH H. HAINES.

Witnesses:
THOS. D. CLAYTON,
DAVID CARVER.